(12) United States Patent
Grannell et al.

(10) Patent No.: US 9,407,525 B1
(45) Date of Patent: *Aug. 2, 2016

(54) MEASURING TRAFFIC UTILIZATION (71) Applicant: SPRINT COMMUNICATIONS COMPANY, L.P., Overland Park, KS (US)

(72) Inventors: James Paul Grannell, Overland Park, KS (US); Eugene D. Ramirez, Fremont, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/709,971

(22) Filed: May 12, 2015

Related U.S. Application Data

(63) Continuation of application No. 13/628,889, filed on Sep. 27, 2012, now Pat. No. 9,065,737.

(51) Int. Cl.
*H04L 12/26* (2006.01)

(52) U.S. Cl.
CPC .......... *H04L 43/0894* (2013.01); *H04L 43/062* (2013.01); *H04L 43/16* (2013.01)

(58) Field of Classification Search
CPC ......... H04L 43/00; H04L 43/02; H04L 43/04; H04L 43/0876; H04L 12/2602
See application file for complete search history.

(56) References Cited

U.S. PATENT DOCUMENTS

| | | | | |
|---|---|---|---|---|
| 5,867,483 A | * | 2/1999 | Ennis, Jr. ............ | H04L 41/0896 370/252 |
| 7,684,345 B2 | * | 3/2010 | Lin ..................... | H04L 43/0852 370/252 |
| 8,213,323 B1 | * | 7/2012 | Papagiannaki ...... | H04L 43/0882 370/246 |

* cited by examiner

*Primary Examiner* — Curtis A Alia (57) ABSTRACT

Systems, methods, and computer storage media for measuring traffic utilization are provided. The method includes timing predetermined time intervals that are relatively small to provide for real-time monitoring of a system. A count of the bytes received is identified in order to monitor a number of bytes received within the predetermined time interval. When the number of bytes received exceeds a predetermined threshold, a larger time interval is captured such that the system can identify how many times the number of bytes received exceeded the predetermined threshold within the larger time interval. When the number of bytes received exceeds the predetermined threshold a number of times greater than a violation threshold, an alarm is generated. This allows a system to monitor high frequency violations. Also, the counts for each time interval are continuously zeroed out after the time interval expires, thus, eliminating a need for calculations.

16 Claims, 5 Drawing Sheets

MEASURING TRAFFIC UTILIZATION

CROSS-REFERENCE TO RELATED APPLICATIONS

This application is a continuation of U.S. patent application Ser. No. 13/628,889, filed Sep. 27, 2012, entitled "Measuring Traffic Utilization," which is incorporated herein by reference in its entirety.

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter. In brief, and at a high level, this disclosure describes, among other things, measuring traffic utilization. Utilizing embodiments hereof, timers and counters are utilized to measure a number of bytes receives in predetermined time intervals that are relatively small in order to provide real-time monitoring of a system. The number of bytes is compared to predetermined thresholds to identify when utilization rates are particularly high in order to generate alarms.

BRIEF DESCRIPTION OF THE DRAWINGS

Illustrative embodiments of the present invention are described in detail below with reference to the attached drawing figures, and wherein.

DETAILED DESCRIPTION

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer storage media for measuring traffic utilization. Utilizing embodiments hereof, traffic utilization may be monitored by timing configurable time intervals to identify a number of bytes received within the time intervals. The time intervals may be small to provide for real-time monitoring. Additionally, the count of the number of bytes received may be continuously zeroed out upon the expiration of each time interval. Thus, upon the expiration of a time interval, it is easy to identify a count of bytes received during the time interval without performing any calculations. When a number of bytes received exceed a threshold, an alarm may be generated.

Accordingly, in one aspect, embodiments of the present invention is directed to one or more computer storage media having computer-executable instructions embodied thereon that, when executed, perform a method for measuring traffic utilization. The method includes initiating a timer, receiving a frame comprising a plurality of bytes during a first configurable time interval, identifying a count of bytes that indicates a number of bytes within the plurality of bytes that was received during the first configurable time interval, identifying that the first configurable time interval has expired, and clearing the count of bytes.

In yet another aspect, embodiments of the present invention are directed to a system for measuring traffic utilization. The system includes a computing device associated with one or more processors and one or more computer storage media and a traffic utilization engine comprising a receiving component for receiving one or more frames comprising a plurality of bytes, a first timing component for timing a first set of configurable time intervals, a first counting component for counting a count of bytes receiving within a configurable time interval, a first determining component for determining when the count of bytes received within the configurable time interval exceeds predetermined threshold, and an alarm component for generating an alarm when the count of bytes received within the configurable time interval exceeds the predetermined threshold a number of times greater than a violation threshold.

In another aspect, embodiments of the present invention are directed to one or more computer storage media having computer-executable instructions embodied thereon that, when executed, perform a method for measuring traffic utilization. The method includes initiating a first timer to begin timing a first configurable time interval. The first configurable time interval may be one second. A frame comprising a plurality of bytes is received during the first configurable time interval and a count of bytes received is identified. Upon identifying that the first configurable time interval has expired, the count of bytes is cleared.

A determination is then made as to whether or not the number of bytes exceeds a predetermined threshold. Upon determining that the number of bytes exceeds a predetermined threshold, a second timer is initiated to begin timing a second configurable time interval greater than the first configurable time interval. A number of times the number of bytes exceeds the predetermined threshold is identified.

A determination is then made as to whether the number of times the number of bytes exceeds the predetermined threshold is greater than a violation threshold. Upon determining that the number of times the number of bytes exceeds the predetermined threshold is greater than a violation threshold, an alarm is generated.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

- 3G Third Generation Mobile Telecommunications
- 4G Fourth Generation Mobile Telecommunications
- CD-ROM Compact Disk Read Only Memory
- CDMA Code Division Multiple Access
- GPRS General Packet Radio Service
- GSM Global System for Mobile communications: originally from Groupe Special Mobile
- DVD Digital Versatile Discs
- EEPROM Electrically Erasable Programmable Read Only Memory
- HSDPA High-Speed Downlink Packet Access
- LTE Long Term Evolution
- MIB Management Information Base
- MCC Mobile Country Code
- MNC Mobile Network Code
- NID Network Identification Code
- PC Personal Computer
- PDA Personal Digital Assistant
- RAM Random Access Memory
- ROM Read Only Memory
- SID System Identification Code
- SNMP Simple Network Management Protocol
- TDMA Time Division Multiple Access
- UMTS Universal Mobile Telecommunications System
- VOIP Voice Over Internet Protocol
- WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
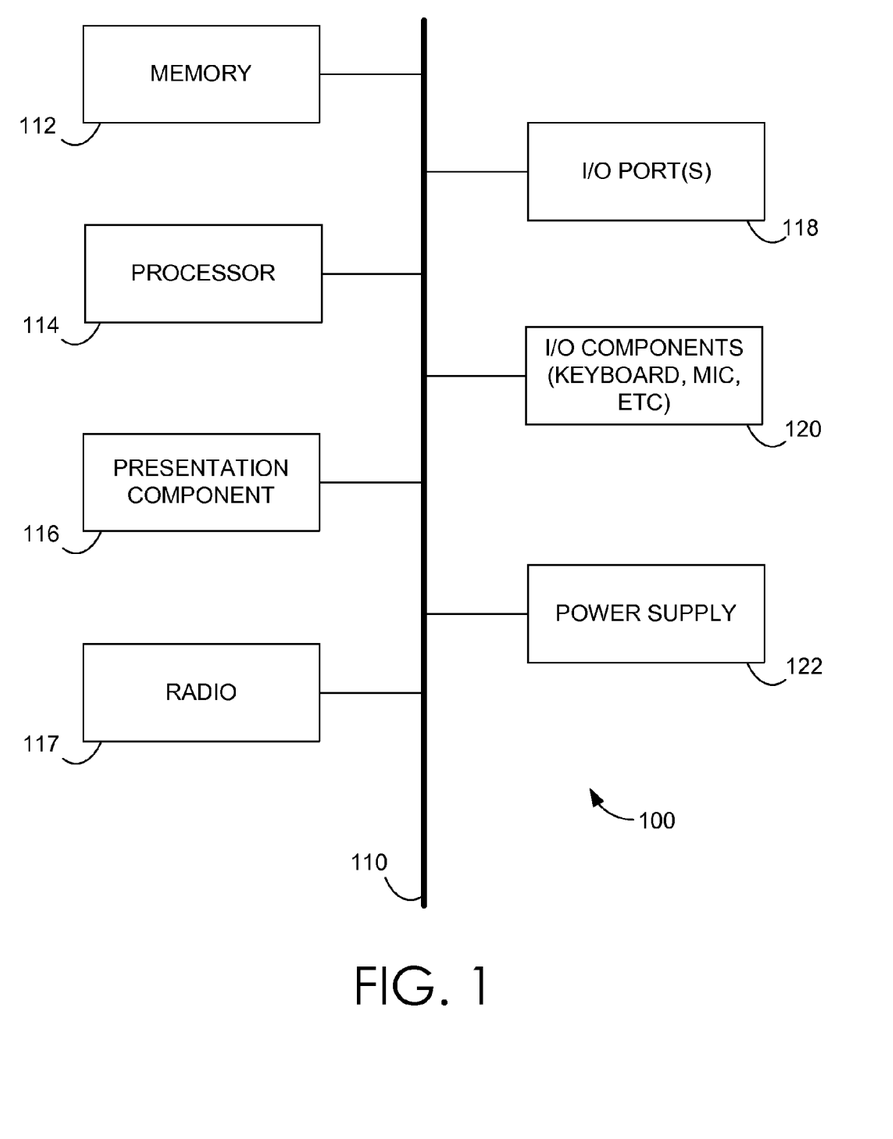
FIG. 1 depicts an exemplary computing device according to embodiments of the present invention.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention provide systems, methods, and computer storage media for measuring traffic utilization. Traffic utilization may be monitored by timing configurable time intervals to identify a number of bytes received within the time intervals. The time intervals may be small to provide for real-time monitoring. Additionally, the count of the number of bytes received may be continuously zeroed out upon the expiration of each time interval. Thus, upon the expiration of a time interval, it is easy to identify a count of bytes received during the time interval without performing any calculations. When a number of bytes received exceed a threshold, an alarm may be generated.

As used herein, traffic utilization refers generally to an amount of information transferred within a network. The amount of information transferred may be measured in bytes. A byte, as used herein, refers to a unit of digital information. A byte typically includes eight (8) bits but the size of the byte may be user-defined. For example, many types of applications use variables represented in eight (8) or fewer bits. In preferred embodiments, the bytes measured consist of 8 bits.

Traffic utilization measurements are important to monitor a system so that the system does not become overloaded, resulting in slower output. Additionally, some users may be subject to usage caps designed to present users from slowing down a network by sending and/or receiving data in excess of their usage cap.

Typically, traffic utilization is monitored by tracking a number of bytes received within a time frame. The time frame is typically large (e.g., fifteen (15) minutes) which does not provide for real-time monitoring of a system. Additionally, once the time frame has passed, calculations must be performed to identify a difference between two time intervals in order to identify a number of bytes in a manageable time frame. The calculations must be performed because a count of the number of bytes received is continuous. In other words, the count does not reset (i.e., zero out) at the expiration of each time interval but, rather, continues to count bytes. Thus, to identify a number of bytes received in a time interval, a user would be required to identify a count of the number of bytes at the beginning of the time interval and at the end of the time interval to identify a difference between the two.

Figure 2:
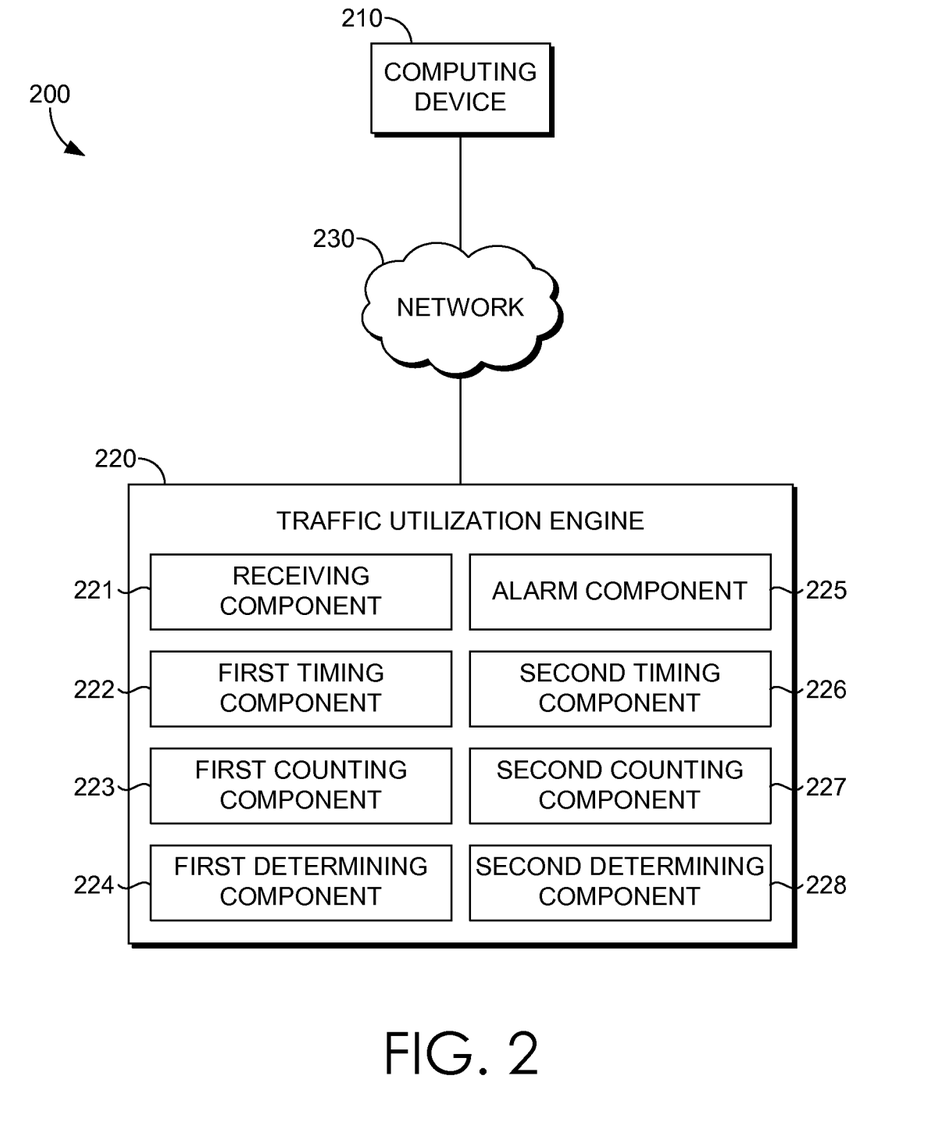
FIG. 2 is a schematic view of an exemplary network environment suitable for use in implementing embodiments of the present invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a computing device 210 may communicate with other devices, such as mobile devices, servers, etc. The computing device 210 may take on a variety of forms, such as a personal computer (PC), a laptop computer, a tablet, a netbook, a mobile phone, a Smart phone, a personal digital assistant (PDA), or any other device that is cable of communicating with other devices. For example, the computing device 210 can take on any form, such as, for example, a mobile device or any other computing device capable of wirelessly communicating with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a computing device comprises a wireless or mobile device with which a wireless telecommunication network(s) can be utilized for communication (e.g., voice and/or data communication). In this regard, the user device can be any mobile computing device that communicates by way of, for example, a 3G or 4G network.

The computing device 210 can utilize network 230 to communicate with other computing devices (e.g., a mobile device(s), a server(s), a personal computer(s), etc.). In embodiments, the network 230 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 230 can include multiple networks, as well as being a network of networks, but is shown in more simple form so as to not obscure other aspects of the present invention. The network 230 can be part of a telecommunication network that connects subscribers to their immediate service provider. In embodiments, the network 230 can be associated with a telecommunications provider that provides services to user devices, such as the computing device 210. For example, the network 230 may provide voice services to user devices or corresponding users that are registered or subscribed to utilize the services (e.g., the network 230) provided by a telecommunications provider. The network 230 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

A traffic utilization engine 220 may be utilized to monitor traffic of a network. The traffic utilization engine 220 may include, among other components, a receiving component 221, a first timing component 222, a first counting component 223, a first determining component 224, an alarm component 225, a second timing component 226, a second counting component 227, and a second determining component 228.

The receiving component 221 may be configured for, among other things, receiving data. In particular, the receiving component 221 may receive frames of data. The frame may comprise a plurality of bytes. The data may be received directly from a computing device, such as computing device 210, or via any other communications means such as, for example, a server.

The first timing component 222 may be configured for, among other things, timing a first configurable time interval. The time interval may be predetermined by a user and may be any length of time desired by a user. In preferred embodiments, the first timing component 222 is configured to time a time interval of one (1) second. By establishing a time interval that is small (i.e., one second), the system is identifying relevant information within the short period of time so that the information is immediately available to a user for near real-time monitoring. In embodiments, timing components (i.e., first timing component 222 and second timing component 226) continue to time configured time intervals even if there is no traffic. Thus, this allows for accounting of all time intervals during a time period.

The first counting component 223 is configured for, among other things, keeping a count of a number of bytes. The first counting component 223 is configured to reset, or zero out, after the expiration of a predefined time interval. For instance, if the first timing component 222 is configured to time one second intervals, the first counting component 223 is configured to count a number of bytes for the one second time interval and then reset the count to zero before counting the bytes for the next one second time interval, and so on. This provides the system with the ability to easily identify a number of bytes for each time interval without requiring time-consuming calculations, additional processing, additional power, etc. The first counting component 223 may be configured to keep a count of bytes for any time interval timed by the first timing component 222.

The first determining component 224 is configured for, among other things, determining whether a count of bytes for the time interval exceeds a predetermined threshold. The predetermined threshold may be, for example, any threshold desired by a user. In embodiments, the first determining component 224 determines when a count of bytes for one second exceeds a predetermined threshold. When the count of bytes exceeds the predetermined threshold an alarm may be generated by, for example, the alarm component 225. The alarm may be any means of notification known in the art including, but not limited to, a text message, an e-mail message, an audible alert, a visual alert, and the like. In embodiments, the alarm may be a simple network management protocol (SNMP) alarm.

Alternatively, an alarm may not be generated when the first determining component 224 determines that the count of bytes exceeds the predetermined threshold. Rather, a second series of components may be implemented to further investigate the count of bytes and whether or not an alarm is necessary. By implementing the second series of components (including the second timing component 226, the second counting component 227, and the second determining component 228) unnecessary alarms are avoided. In particular, alarms may not be needed (or wanted) for every time interval (e.g., every second) that a count of bytes exceeds a predetermined threshold. Instead, the system 200 would be better utilized to track frequent violations of the predetermined threshold rather than every single second that includes an excess number of bytes.

In the scenario where the second series of components is implemented, the second timing component 226 is configured for, among other things, timing a second configurable time interval. The second configurable time interval may be longer than the first configurable time interval timed by the first timing component 222. The second configurable time interval may be any time interval desired by a user. In embodiments, the second configurable time interval is greater than five minutes.

While the second timing component 226 is timing the second configurable time interval, the second counting component 227 is configured for, among other things, counting a number of times the count of bytes exceeds the predetermined threshold. In other words, the first counting component 223 keeps a count of a number of bytes received while the second counting component 227 keeps a count of a number of times the number of bytes received exceeds the predetermined threshold. This is useful to identify frequent violations rather than simply identifying every single violation for every second, which would not be practical or very useful.

As with the first counting component 223, the second counting component 227 may be configured to reset, or zero out, at the end of the second configurable time period. For example, if the second configurable time period is fifteen minutes, then the second counting component 227 zeroes out at the expiration of fifteen minutes and starts counting again for the next configurable time interval. Recall that this zeroing out of the counters eliminates the need for time consuming calculations.

The second determining component 228 is configured for, among other things, determining whether the number of times the count of bytes exceeds the predetermined threshold is greater than a violation threshold. For example, a user may indicate that within a time interval a subscriber may only have five (5) times where the count of bytes exceeds the predetermined threshold. If the subscriber exceeds the five-violation limit, the second determining component 228 may determine that a violation threshold has been breached and an alarm may be generated by the alarm component 225. Thus, the alarm component 225 may generate an alarm that a violation threshold has been breached, a number of bytes received exceed a predetermined threshold, or a combination thereof.

Figure 3:
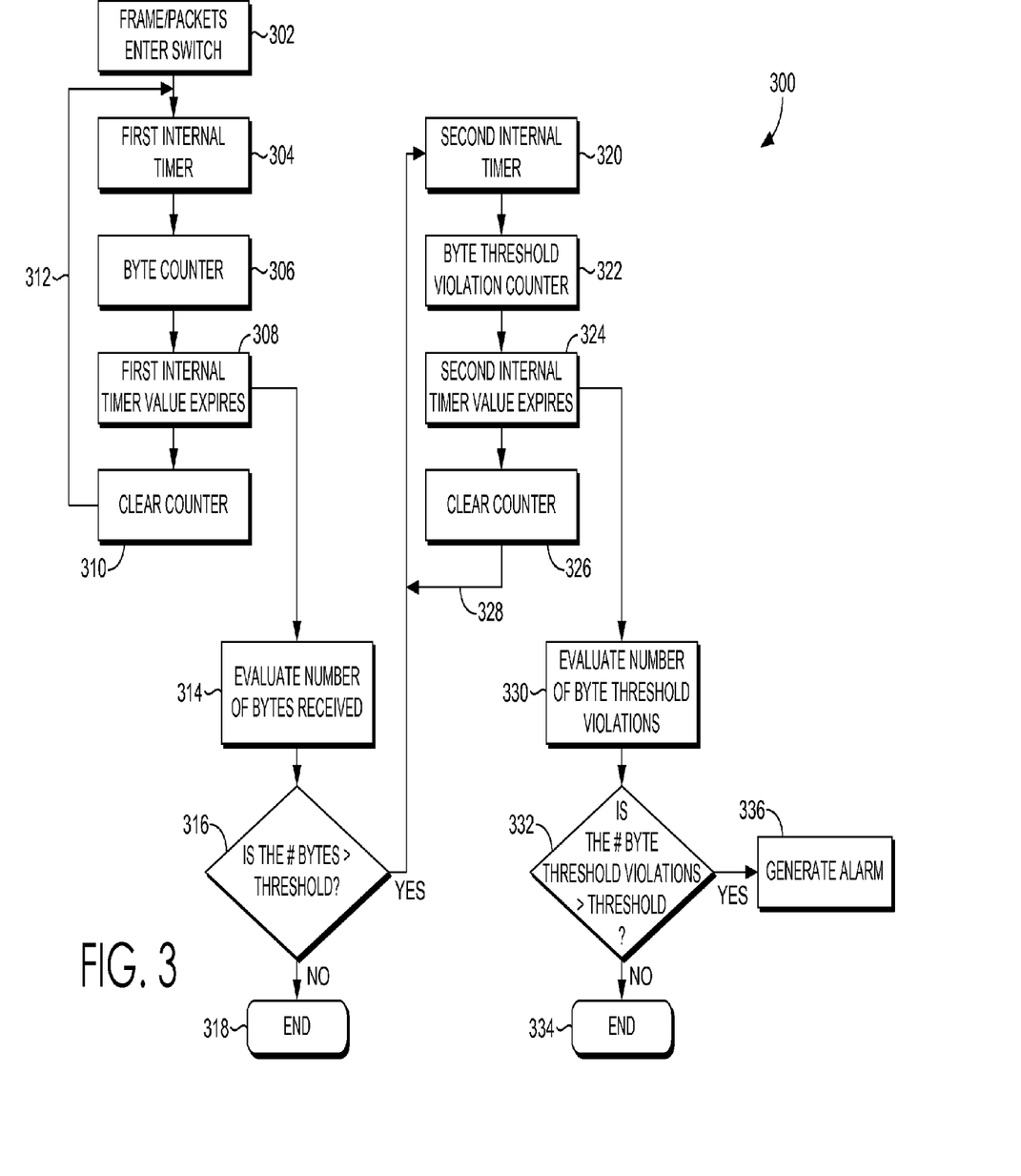
FIG. 3 provides an exemplary flow diagram for measuring traffic utilization, in accordance with an embodiment of the present invention.

Turning now to FIG. 3, an exemplary embodiment is illustrated to monitor traffic utilization. At block 302, a frame (or packets) enters a switch. A switch, as used herein, refers generally to an input component wherein frames of data may be received such as, for example, an Ethernet switch. Frames, as described above and as used herein, refer to packets of data including a plurality of bytes. In the present invention, any type of data may be included in the frame. The system (such as system 200 of FIG. 2) is monitoring the bytes within the frame, not the data.

At block 304 a first internal timer may begin timing a configurable time interval. As discussed with reference to FIG. 2, the first internal timer (i.e., the first timing component 222) may be configured to time any interval designated by a user. In embodiments, the configurable time interval is a short period of time such as, for example, one second.

At block 306 a byte counter (i.e., the first counting component 223) begins counting a number of bytes received until, at block 308, the configurable time interval of the first internal timer expires. In embodiments, the byte counter will count a number of bytes received for one second and then, at block 310, will be cleared or zeroed out. Loop 312 indicates that the first internal timer continuously times the configurable time interval and the counter continuously counts the number of bytes received for the time interval and is continuously zeroed out at the expiration of the time interval.

Upon the expiration of the configurable time interval (e.g., one second), block 314 indicates that the number of bytes received is evaluated. The number of bytes received is evaluated by comparing the number of bytes received to a predetermined threshold of a number of bytes that should not be exceeded within a time interval. This evaluation results in a decision at block 316 of whether or not the number of bytes received exceeds a predetermined threshold. If the number of bytes received does not exceed a predetermined threshold, the evaluation ends at block 318. If, however, the number of bytes received does exceed the predetermined threshold then one of two things may happen. If the user desires, an alarm may be generated to indicate the violation of the predetermined threshold (not shown). While this is possible, it may result in an excessive number of alarms.

Alternatively, or in addition to the alarm, if it is determined that the number of bytes received does exceed the predetermined threshold then a second series of steps may be initiated. At block 320 a second internal timer (i.e., the second timing component 226) may begin timing a second configurable time interval. As described in detail above, the second configurable time interval is greater than the first configurable time interval. For example, if the first configurable time interval is one second then the second configurable time interval should be greater than one second. In embodiments, the first configurable time interval is one second and the second configurable time interval is greater than five minutes.

While the second internal timer is timing the second configurable time interval, a violation counter (i.e., the second counting component 227) tracks a number of times the count of bytes exceeds the predetermined threshold. A violation threshold may be established by a user to indicate a maximum number of times that the count of bytes may exceed the predetermined threshold before triggering an alarm. Block 324 indicates the expiration of the second configurable time interval and the counter is cleared or zeroed out at block 326. Loop 328 indicates that the counter is reset upon the expiration of the second configurable time interval and resets each time the second internal timer begins timing a new time interval.

Upon the expiration of the second configurable time interval a number of byte threshold violations is identified at block 330. In other words, the number of times the count of bytes exceeded the predetermined threshold is identified. Decision block 332 indicates a decision is made as to whether the number of times the count of bytes exceeded the predetermined threshold is greater than the violation threshold. If the number of times the count of bytes exceeded the predetermined threshold is not greater than the violation threshold then the process ends at block 334. If, on the other hand, the number of times the count of bytes exceeded the predetermined threshold is greater than the violation threshold an alarm is generated at block 336 (by, for example, the alarm component 225 of FIG. 2).

It should be appreciated that any of the thresholds described herein may be any value desired by a user.

Figure 4:
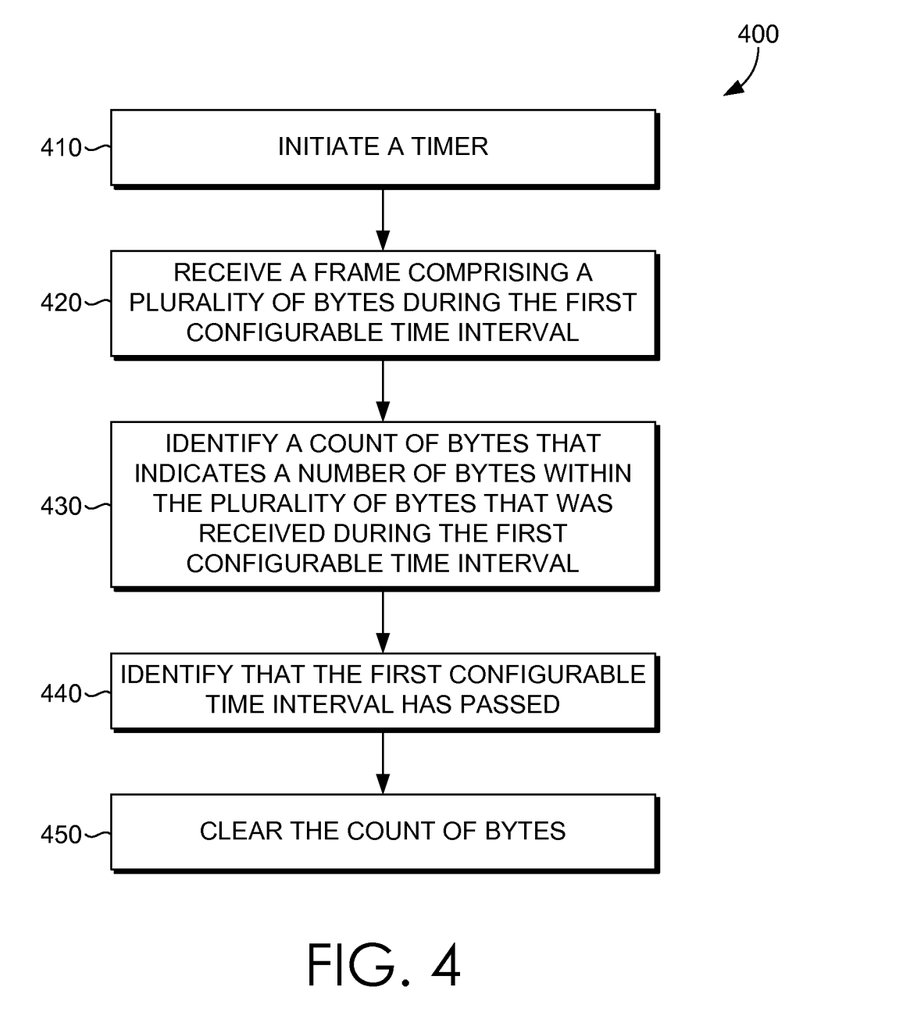
FIG. 4 provides a first exemplary method for measuring traffic utilization, in accordance with an embodiment of the present invention.

Turning now to FIG. 4, an exemplary method 400 for monitoring traffic utilization is depicted. Initially, at block 410, a timer is initiated. As previously described in detail above, the timer may be configured to time relatively short (e.g., one second) time intervals to capture a real-time perspective of the system. At block 420 a frame comprising a plurality of bytes is received during a first configurable time interval timed by the timer. At block 430 a count of bytes is identified that indicates a number of bytes that was receiving during the first configurable time interval. At block 440 the first configurable time interval expires and the count of bytes is cleared at block 450.

Figure 5:
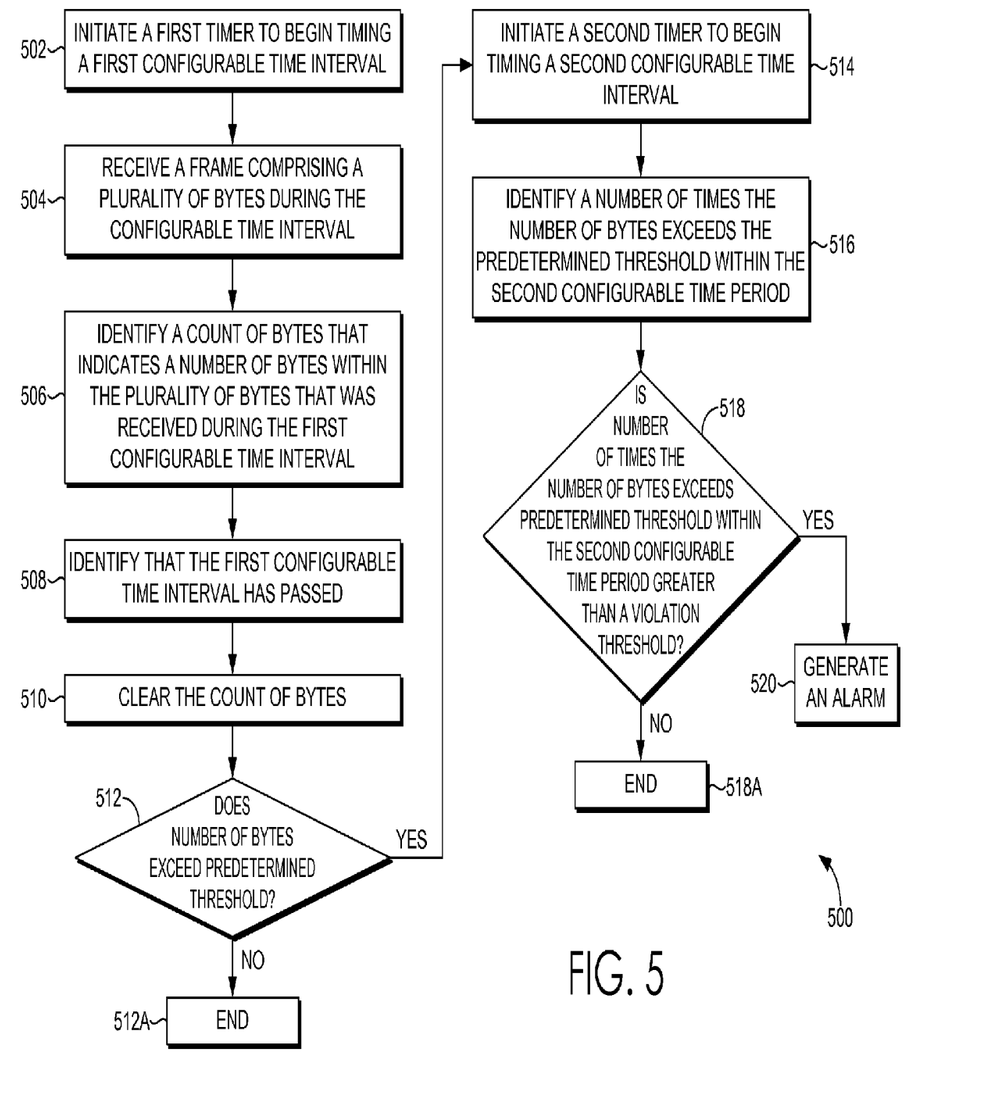
FIG. 5 provides a second exemplary method for measuring traffic utilization, in accordance with an embodiment of the present invention.

Turning now to FIG. 5, an exemplary method 500 for monitoring traffic utilization is depicted. Initially, at block 502, a first timing begins timing a first configurable time interval. A frame comprising a plurality of bytes is received within the first configurable time interval at block 504. At block 506 a count of bytes indicating a number of bytes that was received during the first configurable time interval is identified. At block 508 is it identified that the first configurable time interval has passed. Upon the expiration of a predefined time interval, the count of bytes is cleared as illustrated at block 510. At block 512 it is determined whether the number of bytes exceeds a predetermined threshold. Upon determining that the number of bytes does not exceed the predetermined threshold, the process ends at block 512*a*. However, upon determining that the number of bytes does exceed the predetermined threshold a second timer is initiated to begin timing a second configurable time interval at block 514.

A number of times the number of bytes exceeds the predetermined threshold is identified at block 516. At block 518, it is determined whether the number of times the number of bytes exceeds the predetermined threshold is greater than a violation threshold. Upon determining that the number of times the number of bytes exceeds the predetermined threshold is not greater than a violation threshold, the process ends at block 518*a*. Upon determining that the number of times the number of bytes exceeds the predetermined threshold is greater than a violation threshold, an alarm is generated at block 520.

It will be understood by those of ordinary skill in the art that the order of steps shown in the method 400 of FIG. 4 and method 500 of FIG. 5 is not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer storage media having computer-executable instructions embodied thereon that, when executed, perform a method for measuring traffic utilization, the method comprising:
    initiating a first timer to begin timing a first configurable time interval, wherein the first configurable time interval is periodic;
    receiving a frame comprising a plurality of bytes during the first configurable time interval timed by the first timer;
    identifying a count of bytes that indicates a number of bytes within the plurality of bytes that was received during the first configurable time interval;
    identifying that the first configurable time interval has expired;
    determining whether the count of bytes exceeds a predetermined threshold;
    clearing the count of bytes;
    when the count of bytes exceeds the predetermined threshold, then initiating a second timer to begin timing a second time interval, wherein the second time interval is greater than the first configurable time interval;
    for each occurrence of the first configurable time interval during the second time interval, determining whether the count of bytes exceeds the predetermined threshold;
    generating a violation count that indicates a number of times the count of bytes exceeded the predetermined threshold during the second time interval; and
    when the violation count exceeds a violation threshold, then generating an alarm.

2. The media of claim 1, wherein the first configurable time interval is one second.

3. The media of claim 1, further comprising resetting the first timer to begin timing a second configurable time interval.

4. The media of claim 3, wherein the second configurable time interval is one second.

5. The media of claim 1, further comprising generating an alarm when the count of bytes exceeds the predetermined threshold.

6. A system for measuring traffic utilization, the system comprising:
    a computing device associated with one or more processors and one or more computer storage media; and
    a traffic utilization engine comprising:
    a receiving component for receiving one or more frames, wherein the one of more frames comprises a plurality of bytes;
    a first timing component for timing a first set of configurable time intervals;
    a first counting component for counting a count of bytes received within a configurable time interval, wherein the configurable time interval is periodic;
    a first determining component for
        A) determining when the count of bytes received within the configurable time interval exceeds a predetermined threshold and clearing the count of bytes,
        B) when the count of bytes exceeds the predetermined threshold, then initiating a second timer to begin timing a second time interval, wherein the second time interval is greater than the first configurable time interval,
        C) for each occurrence of the first configurable time interval during the second time interval, determining whether the count of bytes exceeds the predetermined threshold, and
        D) generating a violation count that indicates a number of times the count of bytes exceeded the predetermined threshold during the second time interval; and
    an alarm component for generating an alarm when the violation count exceeds the predetermined threshold a number of times greater than a violation threshold.

7. The system of claim 6, wherein the traffic utilization engine further comprises a second timing component for timing a second set of configurable time intervals that is greater than the first set of configurable time intervals, wherein the first set of configurable time intervals includes time intervals of one second and the second set of configurable time intervals includes time intervals of five minutes.

8. The system of claim 7, wherein the traffic utilization engine further comprises a second counting component for counting the number of times the count of bytes exceeds the predetermined threshold within the second set of configurable time intervals.

9. The system of claim 8, wherein each of the first and second counting components is zeroed out after a respective configurable time interval expires.

10. The system of claim 6, wherein the traffic utilization engine further comprises a second determining component for determining whether the violation count is greater than the violation threshold.

11. The system of claim 10, wherein the alarm component generates an additional alarm upon the determination that the count of bytes exceeds the predetermined threshold.

12. The system of claim 10, wherein the violation threshold is seventy percent utilization.

13. A method for indicating high traffic utilization, the method comprising:
- initiating a first timer comprising a processor configured to begin timing a first configurable time interval, wherein the first configurable time interval is periodic;
- receiving a frame comprising a plurality of bytes during the first configurable time interval timed by the first timer;
- identifying a count of bytes that indicates a number of bytes within the plurality of bytes that was received during the first configurable time interval;
- identifying that the first configurable time interval has expired;
- determining whether the count of bytes exceeds a predetermined threshold;
- clearing the count of bytes;
- when the count of bytes exceeds the predetermined threshold, then initiating a second timer to begin timing a second time interval, wherein the second time interval is greater than the first configurable time interval;
- for each occurrence of the first configurable time interval during the second time interval, determining whether the count of bytes exceeds the predetermined threshold;
- generating a violation count that indicates a number of times the count of bytes exceeded the predetermined threshold during the second time interval; and
- when the violation count exceeds a violation threshold, then indicating high traffic utilization by generating an alarm.

14. The method of claim 13, wherein the first configurable time interval is one second.

15. The method of claim 13, further comprising resetting the first timer to begin timing a second configurable time interval.

16. The method of claim 15, wherein the second configurable time interval is one second.

* * * * *